US008320451B2

(12) United States Patent
Brandsma et al.

(10) Patent No.: US 8,320,451 B2
(45) Date of Patent: Nov. 27, 2012

(54) REPLACEMENT OF FRAME DATA IN A VIDEO STREAM SIGNAL

(75) Inventors: Ewot Brandsma, Eindhoven (NL); Albert M. A. Rijckaert, Waalre (NL)

(73) Assignee: Entropic Communications, Inc., San Diego, CA (US)

( * ) Notice: Subject to any disclaimer, the term of this patent is extended or adjusted under 35 U.S.C. 154(b) by 1072 days.

(21) Appl. No.: 12/161,570

(22) PCT Filed: Jan. 18, 2007

(86) PCT No.: PCT/IB2007/050172
§ 371 (c)(1),
(2), (4) Date: Jul. 21, 2008

(87) PCT Pub. No.: WO2007/083279
PCT Pub. Date: Jul. 26, 2007

(65) Prior Publication Data
US 2009/0016435 A1    Jan. 15, 2009

(30) Foreign Application Priority Data
Jan. 20, 2006    (EP) .................................... 06100668

(51) Int. Cl.
H04N 7/12     (2006.01)
H04N 11/02    (2006.01)
H04N 11/04    (2006.01)
H04N 7/01     (2006.01)
H04N 11/20    (2006.01)
H04N 9/74     (2006.01)

(52) U.S. Cl. .................... 375/240.12; 348/441; 348/584

(58) Field of Classification Search .................. None
See application file for complete search history.

(56) References Cited

U.S. PATENT DOCUMENTS 5,956,088 A * 9/1999 Shen et al. ............... 375/240.25
(Continued)

FOREIGN PATENT DOCUMENTS

CN           1465180 A        12/2003
(Continued)

OTHER PUBLICATIONS

Eerenberg O et al; "MPEG-2 Compliant Trick Play Over a Digital Interface". IEEE Transactions on Consumer Electronics, IEEE USA, vol. 51, No. 3, August 2005, pp. 958-966.

(Continued)

*Primary Examiner* — Xavier Szewai Wong

(57) ABSTRACT

An apparatus processes a video stream signal. The video stream signal represents a succession of frames, comprising a plurality of dependent frames that each provide for prediction of visual content using selectable ones of a preceding and following anchor frame that precede and follow the plurality of frames respectively. When a shortage of transmission bandwidth occurs, the apparatus generates a processed version of the video stream signal wherein a bit-rate alteration is performed starting from one of the dependent frames before an end of said plurality. Said alteration is executed by substituting a standard prediction from the following anchor frame at least for data in the video stream signal that encodes a region in said one of the dependent frames. The bit rate alteration is accompanied by a switch to a mode in which the processing circuit substitutes a standard prediction from the following anchor frame in all following dependent frames that follow said one of the dependent frames until the following anchor frame, for data in the video stream signal that encodes the region in said following dependent frames. In an embodiment interlacing is killed for the replaced regions.

24 Claims, 5 Drawing Sheets

U.S. PATENT DOCUMENTS 6,683,987 B1    1/2004    Sugahara
2005/0105619 A1*    5/2005    Lee et al. ................. 375/240.16

FOREIGN PATENT DOCUMENTS

| WO | 02087232 A | 10/2002 |
| WO | WO 02087232 A1 * | 10/2002 |
| WO | 030036971 A | 5/2003 |
| WO | 2005065030 A2 | 7/2005 |

OTHER PUBLICATIONS

English abstract of CN Patent 1465180A, publication date Dec. 31, 2003, as downloaded from espacenet.com on Aug. 18, 2010, 1 page.

* cited by examiner

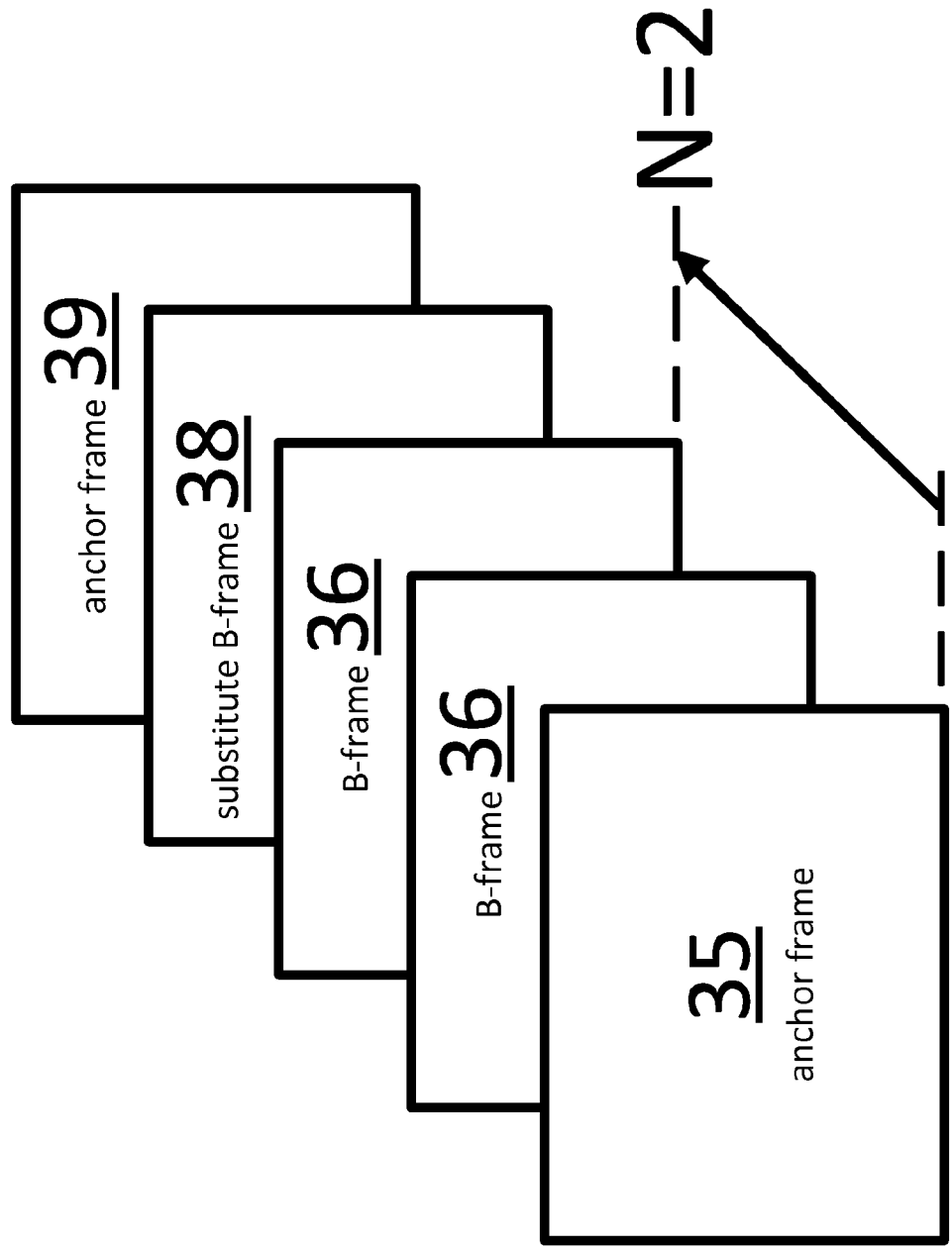

REPLACEMENT OF FRAME DATA IN A VIDEO STREAM SIGNAL

The invention relates to an apparatus and method for processing a video stream signal.

From WO2005/065030 it is known to reduce the bit-rate of an MPEG video stream signal by replacing selected B frames by "empty" frames, each indicating that an adjacent anchor frame (I or P frame) should be copied. U.S. Pat. No. 5,956,088 describes a similar technique. Thus a reduced quality video stream is realized which requires less data than the original stream with non-empty B frames, with non-zero motion vectors and residue data. In an embodiment WO2005/065030, describes how only selected parts of B frames with low-motion can be made empty, which results in higher quality video at the expense of less data reduction.

It has been found that this technique may lead to disturbing artifacts when it is applied to interlaced video, i.e. when each frame comprises a plurality of fields. Moreover, this technique has been found to be awkward in real-time data reduction applications, because of potential latency in the response to the demand for bit rate reduction. It is necessary to wait for a B frame that is adjacent to an anchor frame before the bit rate can be reduced. When the first frame at hand after a demand for bit rate reduction is emptied, which can be a B frame that is not adjacent to an anchor frame, or even an anchor frame, emptying of frames will also lead to disturbing artifacts.

The inventors have found that these disturbing artifacts are due to the fact that emptying of frames may lead to non-monotonicity in the temporal sequence of the changed video stream. The temporal sequence is non-monotonous when the original input time-point of successively displayed image data sometimes decreases with progression of display time, i.e. does not progress or remains the same. Although artistic monotonicity of television programs is not regarded as a positive feature, temporal frame-to-frame monotonicity of predictions is desirable to avoid disturbing artifacts.

WO2002087232 describes a slow-motion replay technique that uses interlace killing. A slow motion MPEG stream is generated by adding additional frames to an original MPEG stream. The additional frames are designed to cause repetition of previous frames. When interlaced video is used, wherein frames comprise a plurality of fields, for each additional frame the different fields of the additional frame are made to be repetitions of a same field in of a source frame from the original stream. This eliminates a vibrating impression that would arise if different fields in the additional frame were repetitions of different fields in of the source frame. This document concerns addition of frames for slow-motion and removal of frames for fast play, but not substituting of frames to reduce bit-rate.

Among others it is an object to improve temporal monotonicity of a video stream signal wherein frames are at least partly emptied to reduce the bit rate.

Among others it is an object to improve temporal monotonicity of an interlaced video stream signal wherein frames are at least partly emptied to reduce the bit rate.

A method, apparatus and computer program product according to the independent claims are provided. Herein a bit-rate of the video stream signal is altered in a plurality of frames that can be predicted using forward and backward references (e.g. MPEG B frames). A standard prediction from a following anchor frame is substituted in one of the dependent frames, and a similar standard prediction from the following anchor frame is substituted in all following dependent frames that follow said one of the dependent frames in the plurality. In an embodiment a real-time decision is made to start bit rate reduction according to real-time information about available bandwidth. In this case the substitution can be made in any upcoming frame when needed in view of reduced bandwidth. In that case all the following frames in the plurality are given the same treatment, irrespective of whether bandwidth is still too low. Thus, non-monotonicity is avoided.

In an embodiment, when substitution of a standard prediction is needed in view of bandwidth, it is tested whether the upcoming frame is a temporally first frame in the plurality of forward and backward dependent frames. If so a standard prediction from a preceding anchor frame is substituted and not a prediction from a following anchor frame. Thus, if more bandwidth becomes available monotonicity can be ensured without substituting standard predictions in all subsequent frames. In a further embodiment, similar standard predictions from a preceding anchor frame are substituted in subsequent frames if the bandwidth shortage persists. In a yet further embodiment this continues only until a predetermined frames distance from the previous anchor frame is reached. Subsequently, standard predictions from the following anchor frame are used, which means that this will be applied to all subsequent forward and backward predictable frames up to that anchor frame, irrespective of further bandwidth conditions.

In another embodiment interlaced fields are used in the frames in this embodiment, when a standard prediction is substituted all fields in a substituted frame are standardly made to refer to the same field in an anchor frame. This avoids non-monotonicity.

These and other objects and advantages will become apparent from a description of exemplary embodiments, using the following figures.

Figure 3A:
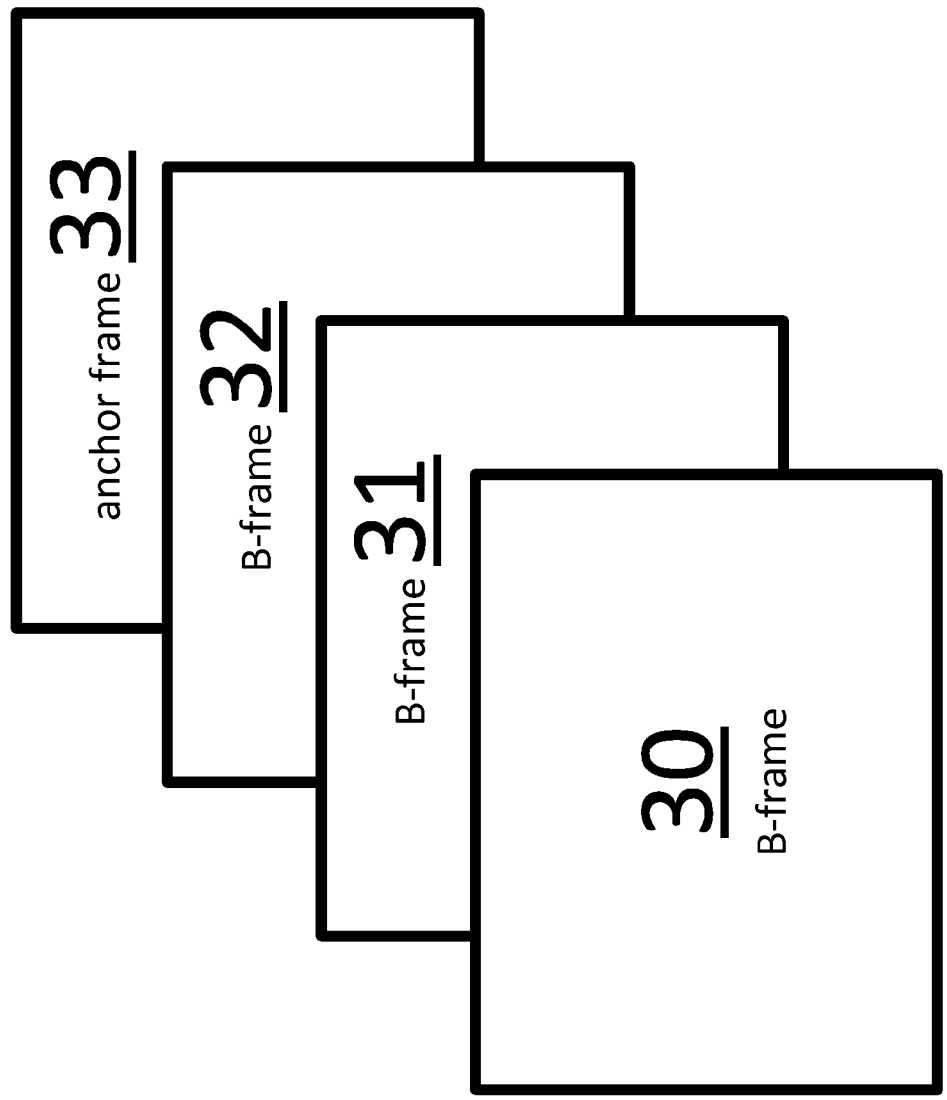

FIG. 3a,b show frames in a video stream

Figure 4:
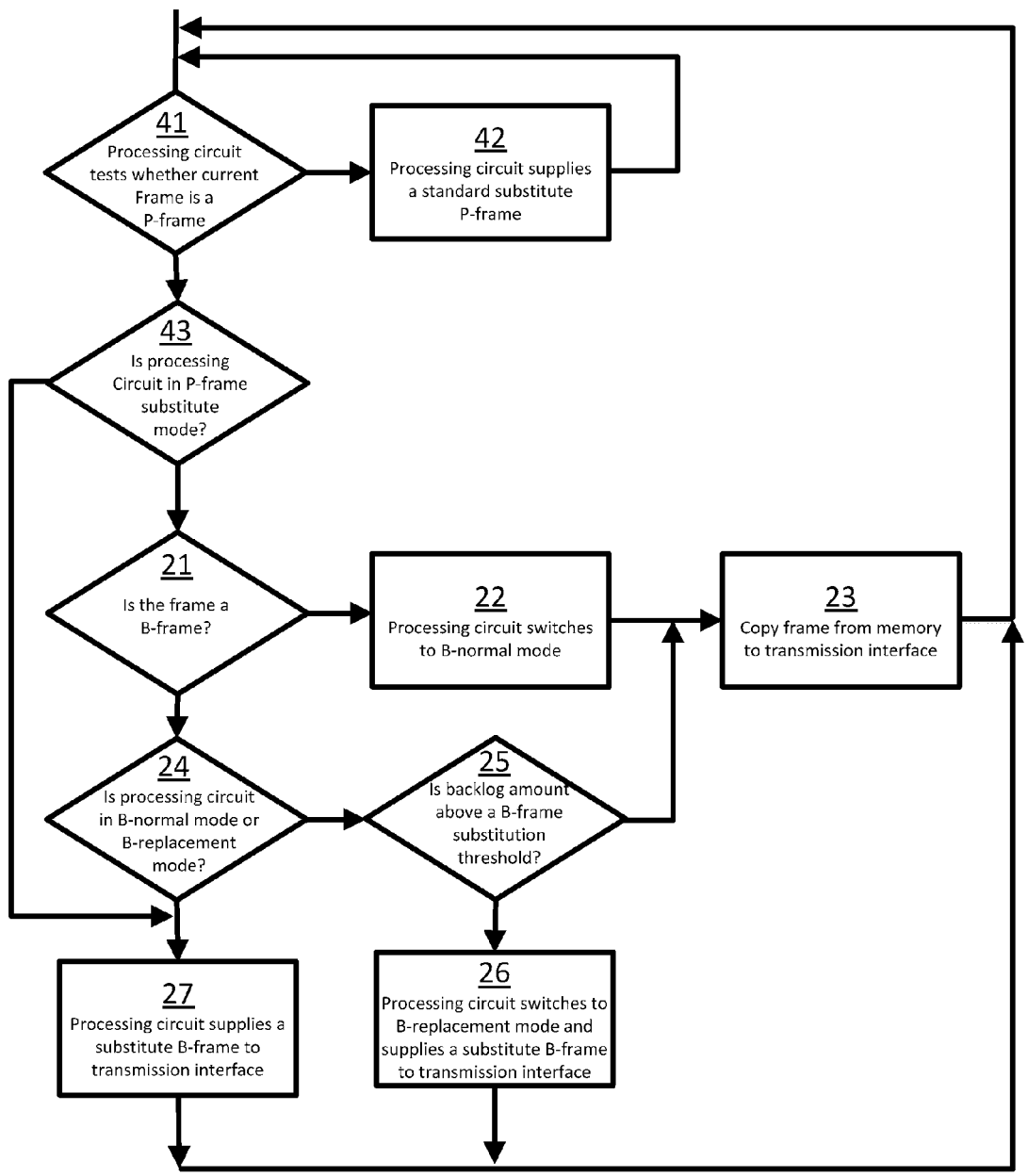

FIG. 4 shows a flow-chart of video stream processing

Figure 1:
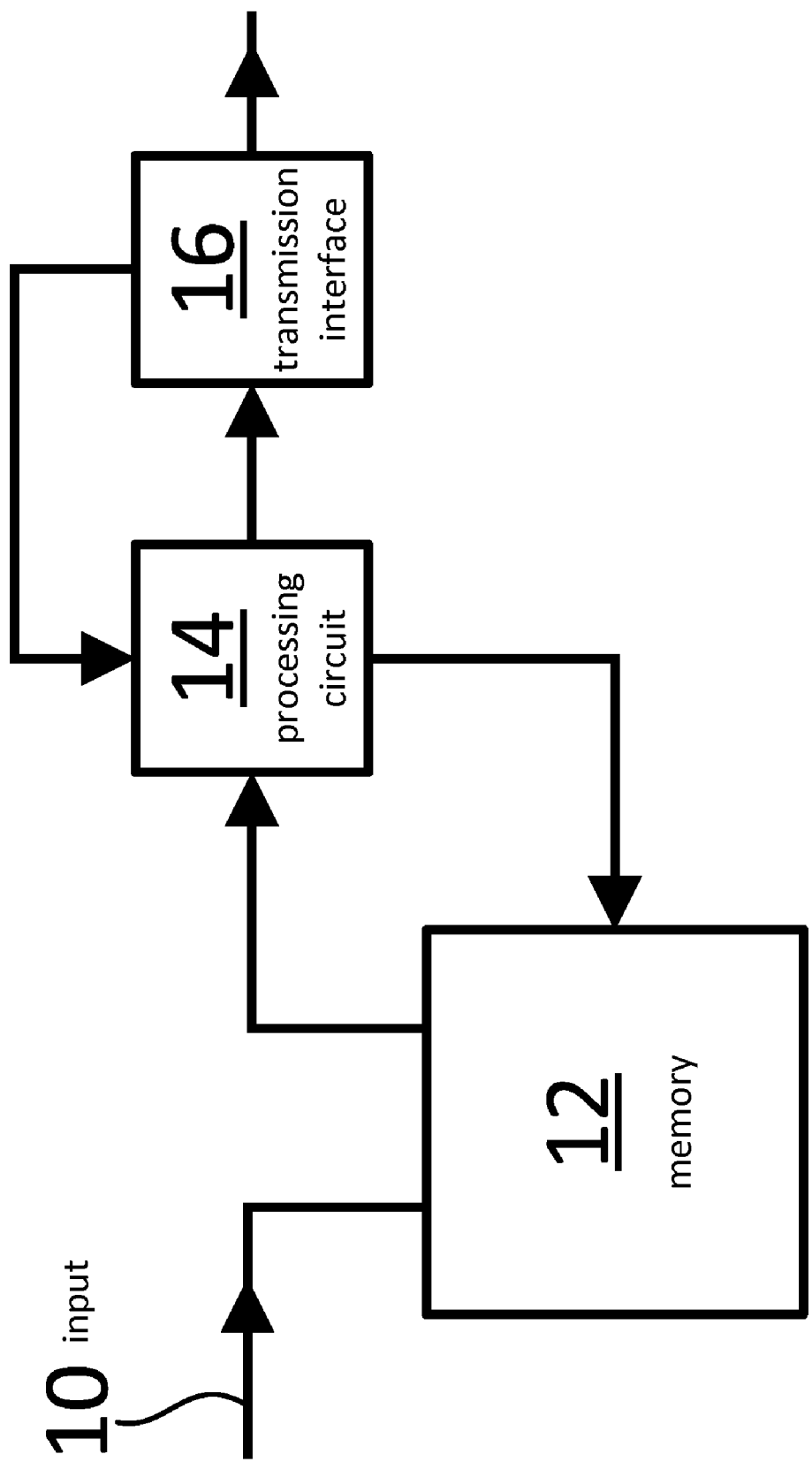
FIG. 1 shows a video stream processing apparatus

FIG. 1 shows a video stream processing apparatus, with an input 10, a memory 12, a processing circuit 14 and a transmission interface 16. Input 10 and processing circuit 14 are coupled to memory 12. Processing circuit 14 has a stream output and a control input coupled to transmission interface 16.

In operation an MPEG stream is supplied to input 10. A sliding window of data from the stream is buffered in memory 12. Processing circuit 14 receives information from transmission interface 16 indicating the whether and/or how much bandwidth is available for transmission. Processing circuit 14 compares the available bandwidth with a threshold bandwidth needed for transmitting the received stream. When the bandwidth is above the threshold, processing circuit 14 reads all data from the stream from memory 12 and causes transmission interface 16 to transmit the data.

If processing circuit 14 determines that the bandwidth drops below a threshold value it replaces selected frames from the MPEG stream by frames that indicate merely that a copy of another (part of a) frame should be made.

As is well known, a video signal represents a series of frames (images) that should be displayed successively in time. In an MPEG stream, each frame can be encoded as an I-frame, a P-frame or as a B-frame. Each I-frame is represented autonomously, so that it can be decoded without need to access other frames. Each P-frame is represented using motion vectors, which indicate source locations of image blocks in a previous I-frame or P-frame (referred to as an anchor frame), plus residue information. On decoding an image is generated for the P-frame by copying blocks from the anchor frame according to the motion vectors and correcting the resulting image according to the residue information. B frame are represented similarly as P frames, but with motion vectors that can refer to future anchor frames as well as to previous anchor frames. When a frame is a copy of a previous frame it can be encoded as a B frame or a P frame with trivial motion vectors (all zero) and trivial residue information (all zero). Such a copy frame requires hardly any bandwidth, compared with normal P frames or B frames.

If processing circuit 14 determines that the bandwidth drops below a threshold value it supplies a substitute P frame or B frame to transmission interface 16 instead of a received frame from memory 12. The substitute frame indicates that a copy of an anchor frame should be made in a standard way, independent of the image content of the original frame for which it is a substitute. If no bandwidth is available at all, processing circuit 14 may also wait (transmitting no frames) and then, when bandwidth becomes available again, catch up by transmitting one or more substitute P frames or B frames. Of course, if no transmission is possible for some time from transmission interface 16, properly timed decoding in a decoder (not shown) may also have to be interrupted. Hence, with little more loss the frames could be omitted altogether (instead of being replaced) in this case, or the original frames could be transmitted after the interruption if sufficient buffer space is available.

Interlaced frames can be used in a video stream signal. An interlaced frame is represented by a plurality of fields (typically two fields), which are sub-images that each contain a respective set of lines of pixels from the complete frame. The positions of the lines in the respective sets are interleaved, the positions of lines from different fields alternating with one another in the image. When an interlaced frame is used, updated fields from the interlaced frame are displayed successively in time: first the lines of one field are updated and subsequently those of the next field data from one field are updated. MPEG streams support interlaced frames, allowing for separate representation of blocks of pixels from different fields, and use of motion vectors for blocks in fields rather than on a frame basis.

In an embodiment, processing circuit 14 is configured so that, if processing circuit 14 supplies a substitute interlaced P frame or interlaced B frame to transmission interface 16 instead of a received frame from memory 12, processing circuit 14 kills interlacing for that frame (or at least for an initial P frame if that P frame is an initial one of a sequence of substituted frames). By "killing interlacing" for a frame it is meant that all fields from that frame are made to be copies of data from a same field in an anchor frame. Techniques to implement interlace killing can be found in WO2002087232. When the display time of the anchor frame precedes the frame with killed interlacing copies from a temporally last field in the anchor frame are used. When the display time of the anchor frame follows the frame with killed interlacing copies from a temporally first field in the anchor frame are used.

This prevents non-monotonicity of the fields in the replaced frame. Without interlace killing, the different fields would refer back to different fields in the anchor frame, so that successively updated fields during display would correspond to data for increasing and decreasing time values.

In a first embodiment the replacement of the field and interlace killing is performed for the entire content of each field. In a second embodiment, partial field replacement may be used. In this embodiment processing circuit 14 selects regions in a field (e.g. blocks or macro-blocks) for which the encoded data is replaced by standard data and other regions for which the encoded data is retained. The standard data, which is independent of the image content of the original region for which it is a substitute, indicates that a copy of data from the anchor frame should be used. For the regions where data is retained, content dependent residue information and motion vectors may be in use. For example, regions with high motion may be selected for this purpose, which may be detected as described in WO2005/065030.

In this second embodiment processing circuit 14 selects the standard data for different fields of a frame so that each causes copying from a same field in the anchor frame for that frame. When the display time of the anchor frame precedes the frame with killed interlacing copies from a temporally last field in the anchor frame are used. When the display time of the anchor frame follows the frame with killed interlacing copies from a temporally first field in the anchor frame are used.

In an embodiment processing circuit 14 is configured to respond to temporally varying bandwidth availability by selection of frames for which data will be substituted. Various forms of response to the available bandwidth may be used. In a first embodiment, for example, processing circuit 14 computes an amount of backlog due to bandwidth availability. In this embodiment the amount of backlog is used to control substitution but, as will be discussed the amount of backlog is only one advantageous example of information about available bandwidth that can be used to control substitution. For example, in an alternative embodiment instead of the amount of backlog a time difference may be used between on one hand a time point at which a future frame should be transmitted to preserve real-time properties of the video stream and on the other hand the projected transmission time of the future frame if the current frame is not replaced by a standard frame.

The amount of backlog is determined from a required transmission rate of frames and the actual transmission rate achieved by transmission interface 16. The amount of backlog at a time point represents a difference between a number of frames that should have been transmitted up to that time point according to the required transmission rate and a number of frames that has actually been transmitted. When the available bandwidth is too low to transmit the incoming video stream at the required rate of frames the computed amount of backlog starts to increase. When this occurs, processing circuit 14 starts to substitute frames in the video stream.

Figure 2:
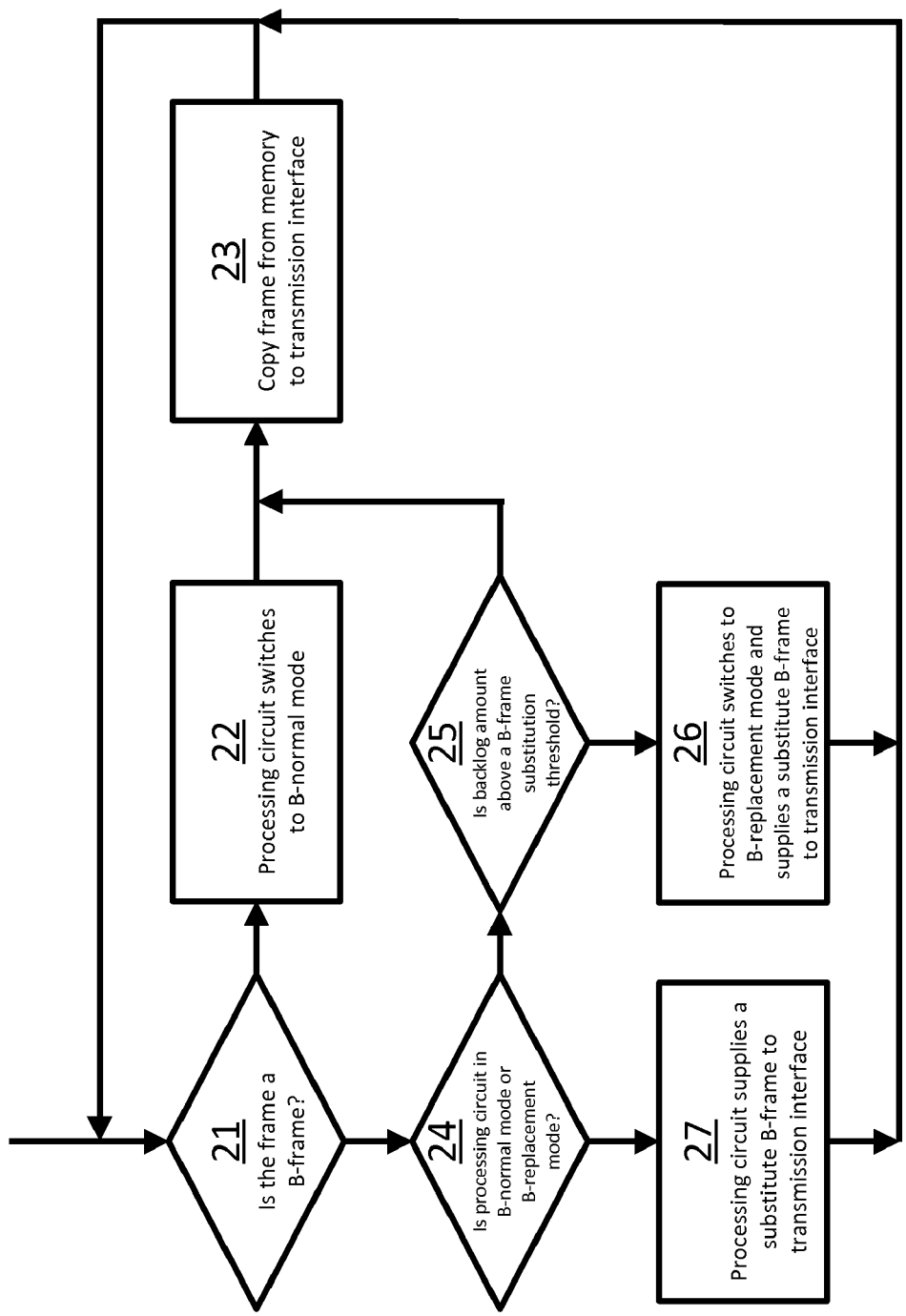
FIG. 2 shows a flow-chart of video stream processing

FIG. 2 shows steps for transmission of a frame in a flowchart. In a first step 21 processing circuit 14 tests whether the frame is a B frame. If not, processing circuit 14 executes a second step 22 wherein processing circuit switches to a B-normal mode, which will be explained in the following. Next processing circuit 14 executes a third step 23 copying the frame from memory 12 to transmission interface 16 when transmission interface 16 is able to transmit the frame (or to buffer the frame for transmission). From third step 23 processing circuit 14 proceeds back to first step 21 for the next frame.

If processing circuit 14 determines in first step 21 that the frame is a B frame then processing circuit 14 executes a fourth step 24, wherein processing circuit 14 test whether it is in the B-normal mode or the B replacement mode. If processing circuit 14 is in the B normal mode it executes a fifth step 25, testing whether the amount of backlog is above a B frame substitution threshold. If not processing circuit 14 proceeds to third step 23.

If the amount of backlog is above the threshold processing circuit 14 proceeds to a sixth step 26 wherein processing circuit 14 switches to the B replacement mode and supplies a substitute B-frame to transmission interface 16 when transmission interface 16 is able to transmit the frame (or to buffer the frame for transmission). Processing circuit 14 selects the substitute B frame so that on decoding a copy of the next anchor frame in display sequence will be used for the frame. When interlacing is used, then preferably each field of the B frame is made to use data from the same, temporally first field in the anchor frame. From sixth step 26 processing circuit 14 proceeds back to first step 21 for the next frame.

If processing circuit 14 determines in fourth step 24 that it is in the B replacement mode processing circuit 14 proceeds to a seventh step 27 wherein processing circuit 14 supplies a substitute B-frame to transmission interface 16 when transmission interface 16 is able to transmit the frame (or to buffer the frame for transmission). Processing circuit 14 selects the substitute B frame so that on decoding a copy of the next anchor frame in display sequence will be used for the frame. When interlacing is used, then preferably each field of the B frame is made to use data from the same, temporally first field in the anchor frame. From seventh step 27 processing circuit 14 proceeds back to first step 21 for the next frame.

FIG. 3a shows the effect. Once processing circuit has detected that the backlog is above the threshold for one B frame 30, all B frames 31, 32 up to the next anchor frame 33 in the display sequence will be copies of that next anchor frame 33, even if the amount of backlog has dropped below the threshold again. Thus, non-monotonicity is avoided.

In an alternative embodiment sixth step 26 may include a test whether the current (B-) frame 30 directly follows an anchor frame in the display sequence. If so, processing circuit 14 in this alternative embodiment selects the substitute B frame for the current frame 30 so that on decoding a copy of that preceding anchor frame will be used for the current frame 30. In this case, there is no need to switch to the B frame substitution mode in sixth step 26, since there the risk of non-monotonicity is avoided by the reference back to the preceding anchor frame.

In a further embodiment, the same may be done for the current B frame 30 if the preceding frame in the temporal display sequence is a substitute B frame that refers back to a preceding anchor frame. Thus, no switch to the B frame substitution mode needs to be performed in this case either.

FIG. 3b illustrates an example wherein B frames 36 are selected to refer back to a previous anchor frame 35. Processing circuit 14 is configured to select reference to the preceding anchor frame on condition that the preceding frame 35, 36 in the temporal display sequence is an anchor frame 35 or a substitute B frame 36 that refers back to the preceding anchor frame 35. In a further embodiment processing circuit 14 is configured to impose a further condition that a limit is imposed on the number of successive standard B frames 36 that is made to refer back in this way. A predetermined number N of B frames 36 (e.g. N=2 in the example) at most may be selected to refer back to a previous anchor frame 35. When processing circuit 14 determines that this limit N has been reached, processing circuit 14 makes substitute B frames 38 in excess of the predetermined number N refer to a next anchor frame 39.

It should be noted that FIGS. 3a-b show the frames in display sequence. This sequence may differ from the transmission sequence. Typically, in the transmission sequence the anchor frames are transmitted before the frames (e.g. B frames) that are able to refer to these anchor frames.

As will be appreciated the described embodiments ensure that replacement of a B frame by a forward looking standard B frame (i.e. a standard frame that will cause a future anchor frame in terms of temporal display sequence to be copied) is accompanied by substitution of forward looking standard frames for subsequent B frames in the display sequence that could potentially lead to display of image content corresponding to time points before the future anchor frame. Also a forward looking standard B frame is used as a substitute for an original B frame at least if this original B frame is preceded by a not-substituted B frame that potentially could lead to display of image content corresponding to time points after a last preceding anchor frame. Thus non-monotonicity is avoided.

In a further embodiment only regions in the B frames are substituted. In this case, it is preferably ensured that subsequent B frames refer to the next anchor frame in display sequence for the substituted regions at least if no high motion is detected in these regions and the original B frame referred to the next anchor frame in the substituted regions. Thus a maximum monotonicity is ensured. In an embodiment in regions of high motion the encoding from the original B frame is used.

Although embodiments have been shown wherein substitutes are used only for B frames, it should be appreciated that in an alternative embodiment, substitutes may also be used for P frames or even for I frames.

FIG. 4 illustrates such an alternative embodiment, with the flow-chart of FIG. 2 wherein first, second and third additional steps 41, 42, 43 have been added. Also, whenever this alternative embodiment proceeds with a next frame it returns to first additional step 41, instead of returning to first step 21. In first additional step 41 processing circuit 14 tests whether the current frame is a P frame and the amount of backlog exceeds a P frame substitution threshold. If so, second additional step 42 is executed, wherein processing circuit 14 supplies a standard substitute P frame, referring back to copy the previous anchor frame, to transmission interface 16 when transmission interface 16 is able to transmit the frame (or to buffer the frame for transmission). As an alternative for the test of first additional step a lookahead test may be used, testing whether the next frame is a B frame or not, second additional step 42 being executed if there is a shortage of available bandwidth and the next frame is not a B frame.

Also in second additional step 42 processing circuit 14 switches to a P frame substitute mode. From second additional step 42 processing circuit 14 proceeds back to first additional step 41 for the next frame. The P frame substitution threshold is preferably higher than the B frame substitution threshold, so that processing circuit 14 will attempt to handle bandwidth reduction with P frame substitution only when B frame substitution does not suffice.

When the current frame is a not a P frame or the amount of backlog does not exceed the P frame substitution threshold, processing circuit 14 executes third additional step 43, which tests whether the processing circuit is in P frame substitute mode and the current frame is not an I-frame. If not the process proceeds to first step 21, and if so the process jumps to seventh step 27. In this embodiment if the current frame is a P frame seventh step 27 includes replacement of the current P frame by a standard substitute P-frame that refers back to the previous anchor frame (I frame or P frame) to cause copying of that anchor frame. In this embodiment second step 22 includes switching back from P frame substitute mode to a P normal mode if the current frame is an I frame. In this embodiment, second step 22 does not switch-back to B normal mode when the current frame is an I frame. This switch-back is performed on reception of a P frame. Thus, B frames after the I frame, which could refer back to a preceding P frame are replaced by substitutes that include a standard reference to a subsequent P frame, thus ensuring no artifacts.

As can be appreciated the flow chart of FIG. 4 is provided to ensure that when a P frame is replaced by a standard P frame then all subsequent P frames up to the next I frame are also replaced, to avoid use of motion vectors or residues that assume the original P frame, which could lead to visual artifacts. Similarly the B frames from the replaced P frame up to the next I frame in the temporal display sequence are replaced by standard B frames. In addition the B frames that precede the replaced P frame in the temporal display order, starting from the next preceding anchor frame, are replaced by standard B frames. This prevents artifacts. When interlacing is used, then preferably the standard P frame provides that each field of the P frame is made to use data from the same, temporally last field in the preceding anchor frame.

In a further embodiment even an I frame may be replaced by a standard P frame when the amount of backlog exceeds an I frame substitute threshold. In this case too, a mode switch may be used to ensure that when a I frame is replaced by a standard P frame then all subsequent P frames and B frames up to the next I frame are also replaced by such a standard P frame. Preferably also frames that precede the replaced I frame in the temporal display order, starting from the next preceding anchor frame, are replaced by standard B frames to avoid artifacts.

In an embodiment the real-time structure of the video stream (the timing of transmission of frames relative to a reference time point) is preserved as much as possible. That is, the time difference between transmission of frames from transmission interface 16 are made equal to the time differences between arrival of the incoming original frames at input 10. This simplifies timing recovery and avoids additional dejitter buffering in decoders (not shown), because the stream remains MPEG compliant. This time structure preservation may be ensured by buffering in transmission interface 16 and using a time stamp mechanism to control transmission from transmission interface 16.

In another embodiment processing circuit 14 is configured to control timing. In this embodiment the test for the amount of backlog in fifth step 25 is replaced by a test whether without replacement transmission of a future frame (e.g. the immediately next frame) would be delayed more than a threshold above time needed to preserve the real-time structure. If so processing circuit 14 causes the B frame to be replaced by a standard frame, and switches to the mode to replace the next B frames as well. A similar test may be performed for P frame replacement or even I frame replacement. Although an embodiment with a memory 12 and a processing circuit 14 has been shown, wherein all frames are buffered in memory, it should be appreciated that alternatively a system may be used wherein all received frames are immediately passed to transmission interface 16, or replaced by standard substitutes instead of being passed. In this way the real-time structure of the incoming stream is maintained. Dependent on the type of substituted frame, substitutions for subsequent frames will then automatically be made as described in the preceding. As another alternative, only part of the frames (e.g. I and P frames) may be buffered in memory 12 in order to await sufficient bandwidth while other frames are replaced by standard substitutes on reception. Also, replacement by substitutes may be performed before storage in memory 12, although of course this will increase latency of response to bandwidth variations.

Although the embodiments have been described for an MPEG video stream, it should be appreciated that similar techniques can be used for other types of encoded video streams that make use of interlacing and/or use frame prediction in terms of other frames.

Although the embodiments have been described wherein processing circuit 14 uses a computed amount of backlog to select whether to substitute a standard frame, it should be appreciated that various alternatives are possible. For example, instead of the amount of backlog the available bandwidth at the time for transmission of a frame may be used directly as a criterion. Thus, a standard substitute is used for a frame when, at the intended time of transmission of that frame, insufficient bandwidth is available to transmit the frame. In this case a mode switch is used to ensure that subsequent frames will also be replaced by standard frames as necessary to avoid non-monotonicity due to the first substituted frame. As an alternative this could be applied only in the case of B frames or of P and B frames, other frames being transmitted distributed over a longer period if insufficient bandwidth is available. Furthermore, instead of a backlog some form of "bandwidth credit" could be used as a criterion for substitution. This may be useful when no immediate hard limit on bandwidth is imposed but a reduction of bandwidth is required to avoid future problems. The credit may represent a difference between announced bandwidth and used bandwidth. For the decision about substitution a current backlog or credit or a projected backlog or credit after unaltered transmission of a frame may be used. Also more complicated predictions of future backlog or credit may be used or a feedback mechanism that regulates timing.

The invention claimed is:

1. An apparatus for processing a video stream signal that represents a succession of frames, the video stream signal comprising a plurality of dependent frames that each provide for prediction of visual content using selectable ones of a preceding and following anchor frame that precede and follow the plurality of frames in a temporal display sequence of the stream respectively, the apparatus comprising:
   an input for receiving the video stream signal;
   a processing circuit configured to generate a processed version of the video stream signal wherein a bit-rate alteration is performed starting from one of the dependent frames before an end of said plurality of dependent frames, the processing circuit being configured to execute said alteration by substituting a standard prediction from the following anchor frame at least for data in the video stream signal that encodes a region in said one of the dependent frames, and the processing circuit being configured to accompany said alteration by a switch to a mode in which the processing circuit substitutes a standard prediction from the following anchor frame in all following dependent frames that follow said one of the dependent frames until the following anchor frame, for data in the video stream signal that encodes the region in said following dependent frames;
   a transmission interface for transmitting the processed version of the video stream signal;
   wherein the transmission interface is configured to supply the processing circuit with information whether a bandwidth for transmission of the video stream signal has become too low for the video stream signal when not altered;
   wherein the processing circuit is configured to identify an upcoming frame that is next to be transmitted upon said determination has become too low, to determine whether the upcoming frame is a temporally first frame in said plurality of dependent frames, to process the upcoming frame as said one of the dependent frames only provided that the upcoming frame is not the temporally first frame and to substitute a standard prediction from the preceding anchor frame in the upcoming frame from said when the upcoming frame is the temporally first frame.

2. The apparatus according to claim 1, wherein the transmission interface configured to supply the processing circuit with information about a real-time available bandwidth for transmission of the processed version of the video stream signal, the processing circuit being configured to select in real-time to perform the bit rate alteration, in response to said information when said information indicates that the bandwidth has become too low for the video stream signal when not altered, to identify an upcoming frame that is next to be transmitted among the plurality upon said selection to perform bit rate alteration and to process the upcoming frame as said one of the dependent frames.

3. The apparatus according to claim 2, wherein the processing circuit configured to select to perform bit rate alteration bit rate by comparing
  on one hand a required timing preserving transmission time for a future frame, which follows the upcoming frame, the required timing preserving transmission time being needed to preserve a real time property of the video stream signal, with
  on the other hand a projected transmission time of the future frame, given the bandwidth available for transmission, if the upcoming frame is not made to be said one of the dependent frames.

4. The apparatus according to claim 1, wherein the processing circuit is configured to:
  determine whether the upcoming frame follows a preceding frame from said plurality of dependent frames that is a forward predicted frame that uses a standard prediction from the preceding anchor frame;
  substitute a standard prediction from the preceding anchor frame in the upcoming frame on a condition that comprises that the preceding frame is a forward predicted frame;
  make the upcoming frame said one of the dependent frames if said condition is not met.

5. The apparatus according to claim 4, wherein said condition includes a sub-condition that the upcoming frame is less than a threshold number of frames distant from the preceding anchor frame.

6. The apparatus according to claim 1, for processing a video stream signal wherein at least part of the frames are represented using interlaced fields, wherein the processing circuit is configured to set the standard prediction from the following anchor frame so that all fields in said one of the plurality the dependent frame and in all following dependent frames the region is predicted only from a temporally first field of the following anchor frame.

7. The apparatus according to claim 1, wherein the processing circuit configured to substitute a further standard prediction in the following and/or preceding anchor frame, upon detection that insufficient bandwidth is available for transmitting said following and/or preceding anchor frame, and substituting standard predictions in all frames of said plurality of dependent frames upon said detection.

8. The apparatus according to claim 7, wherein the processing circuit is configured to substitute standard predictions in all of the dependent frames when the further prediction is substituted in the following anchor frame.

9. The apparatus according to claim 7, wherein the processing circuit is configured, upon said detection, to substitute standard predictions from a further following anchor frame into further dependent frames between the following anchor frame and the further following anchor frame in a sequence of display, if said further following anchor frame is an I frame of an MPEG signal.

10. An apparatus for processing a video stream signal that represents a succession of frames, at least part of which are represented using interlaced fields, the apparatus comprising
  an input for receiving the video stream signal;
  a processing circuit configured to generate a processed version of the video stream signal by substituting a standard prediction from an anchor frame at least for data in the video stream signal that encodes a region in a dependent frame from the video signal stream; setting all fields in the dependent frame to prediction of that region from a temporally last or first field of the anchor frame, when the anchor frame precedes or follows the dependent frame in a temporal display sequence of the stream respectively;
  a transmission interface transmitting said processed version of the video stream signal;
  wherein the transmission interface is configured to supply the processing circuit with information whether a bandwidth for transmission of the video stream signal has become too low for the video stream signal when not altered;
  wherein the processing circuit is configured to identify an upcoming frame that is next to be transmitted upon said determination has become too low, to determine whether the upcoming frame is a temporally first frame in said plurality of dependent frames, to process the upcoming frame as said one of the dependent frames only provided that the upcoming frame is not the temporally first frame and to substitute a standard prediction from the preceding anchor frame in the upcoming frame from said when the upcoming frame is the temporally first frame.

11. The apparatus according to claim 10, wherein the region comprises the dependent frame entirely.

12. A method of processing a video stream signal that represents a succession of frames, comprising a plurality of dependent frames that each provide for prediction of visual content using selectable ones of a preceding and following anchor frame that precede and follow the plurality of frames in a temporal display sequence of the stream respectively, the method comprising:
  altering a bit-rate of the video stream signal starting from one of the dependent frames before an end of said plurality of dependent frames, by substituting a standard prediction from the following anchor frame at least for data in the video stream signal that encodes a region in said one of the dependent frames;
  substituting a standard prediction from the following anchor frame in all following dependent frames that follow said one of the dependent frames for data in the video stream signal that encodes the region in said following dependent frames;
  transmitting the video stream signal;
  determining, during said transmission, whether a bandwidth for transmission of the video stream signal has become too low for the video stream signal when not altered, and determining an upcoming frame that is next to be transmitted upon said determination has become too low;
  determining whether the upcoming frame is a temporally first frame in said plurality of dependent frames;
  making the upcoming frame said one of the dependent frames only provided that the upcoming frame is not the temporally first frame;
  substituting a standard prediction from the preceding anchor frame in the upcoming frame from said when the upcoming frame is the temporally first frame.

13. The method according to claim 12, comprising
  transmitting the video stream signal;
  real-time monitoring a bandwidth available for transmission of the video stream signal during said transmitting;

real-time selecting to reduce the bit rate when said monitoring indicates that the bandwidth has become too low for the video stream signal when not altered, and identifying an upcoming frame that is next to be transmitted among the plurality upon said selection to reduce the bit rate;

making the upcoming frame said one of the dependent frames.

14. The method according to claim 13, wherein said real-time monitoring comprises comparing on one hand a required timing preserving transmission time for a future frame, which follows the upcoming frame, the required timing preserving transmission time being needed to preserve a real time property of the video stream signal, with on the other hand a projected transmission time of the future frame, given the bandwidth available for transmission, if the upcoming frame is not made to be said one of the dependent frames.

15. The method according to claim 14, comprising determining whether the upcoming frame follows a preceding frame from said plurality of dependent frames that is a forward predicted frame that uses a standard prediction from the preceding anchor frame;

substituting a standard prediction from the preceding anchor frame in the upcoming frame on a condition that comprises that the preceding frame is a forward predicted frame;

making the upcoming frame said one of the dependent frames if said condition is not met.

16. The method according to claim 15, wherein said condition includes a sub-condition that the upcoming frame is less than a threshold number of frames distant from the preceding anchor frame.

17. The method of according to claim 12, wherein at least part of the frames are represented using interlaced fields, wherein the standard prediction from the following anchor frame is set so that all fields in said one of the plurality the dependent frame and in all following dependent frames the region is predicted only from a temporally first field of the following anchor frame.

18. The method according to claim 12, comprising substituting a further standard prediction in the following and/or preceding anchor frame, upon detection that insufficient bandwidth is available for transmitting said following and/or preceding anchor frame, and substituting standard predictions in all frames of said plurality of dependent frames upon said detection.

19. The method according to claim 18, comprising substituting standard predictions in all of the dependent frames when the further prediction is substituted in the following anchor frame.

20. The method according to claim 18, comprising upon said detection substituting standard predictions from a further following anchor frame into further dependent frames between the following anchor frame and the further following anchor frame in a sequence of display, if said further following anchor frame is an I frame of an MPEG signal.

21. A method of processing a video stream signal that represents a succession of frames, at least part of which are represented using interlaced fields, the method comprising substituting a standard prediction from an anchor frame at least for data in the video stream signal that encodes a region in a dependent frame from the video signal stream;

setting all fields in the dependent frame to prediction of that region from a temporally last or first field of the anchor frame, when the anchor frame precedes or follows the dependent frame in a temporal display sequence of the stream respectively;

transmitting the video stream signal;

determining, during said transmission, whether a bandwidth for transmission of the video stream signal has become too low for the video stream signal when not altered, and determining an upcoming frame that is next to be transmitted upon said determination has become too low;

determining whether the upcoming frame is a temporally first frame in said plurality of dependent frames;

making the upcoming frame said one of the dependent frames only provided that the upcoming frame is not the temporally first frame;

substituting a standard prediction from the preceding anchor frame in the upcoming frame from said when the upcoming frame is the temporally first frame.

22. The method according to claim 21, wherein the region comprises the dependent frame entirely.

23. A non-transitory computer-readable medium, encoded with data and instructions, that when executed by a computing device, causes the computing device to:

alter a bit-rate of the video stream signal starting from one of the dependent frames before an end of said plurality of dependent frames, by substituting a standard prediction from the following anchor frame at least for data in the video stream signal that encodes a region in said one of the dependent frames;

substituting a standard prediction from the following anchor frame in all following dependent frames that follow said one of the dependent frames for data in the video stream signal that encodes the region in said following dependent frames;

transmitting the video stream signal;

determining, during said transmission, whether a bandwidth for transmission of the video stream signal has become too low for the video stream signal when not altered, and determining an upcoming frame that is next to be transmitted upon said determination has become too low;

determining whether the upcoming frame is a temporally first frame in said plurality of dependent frames;

making the upcoming frame said one of the dependent frames only provided that the upcoming frame is not the temporally first frame;

substituting a standard prediction from the preceding anchor frame in the upcoming frame from said when the upcoming frame is the temporally first frame.

24. A non-transitory computer-readable medium, encoded with data and instructions, that when executed by a computing device, causes the computing device to:

substituting a standard prediction from an anchor frame at least for data in the video stream signal that encodes a region in a dependent frame from the video signal stream;

setting all fields in the dependent frame to prediction of that region from a temporally last or first field of the anchor frame, when the anchor frame precedes or follows the dependent frame in a temporal display sequence of the stream respectively;

transmitting the video stream signal;

determining, during said transmission, whether a bandwidth for transmission of the video stream signal has become too low for the video stream signal when not altered, and determining an upcoming frame that is next to be transmitted upon said determination has become too low;

determining whether the upcoming frame is a temporally first frame in said plurality of dependent frames;

making the upcoming frame said one of the dependent frames only provided that the upcoming frame is not the temporally first frame;

substituting a standard prediction from the preceding anchor frame in the upcoming frame from said when the upcoming frame is the temporally first frame.

* * * * *

UNITED STATES PATENT AND TRADEMARK OFFICE
CERTIFICATE OF CORRECTION

PATENT NO. : 8,320,451 B2  
APPLICATION NO. : 12/161570  
DATED : November 27, 2012  
INVENTOR(S) : Ewout Brandsma and Albert M. A. Rijckaert Page 1 of 1

It is certified that error appears in the above-identified patent and that said Letters Patent is hereby corrected as shown below:

On the Title page, Item (75) change from "Ewot Brandsma" to "Ewout Brandsma".

Signed and Sealed this  
Nineteenth Day of March, 2013

Teresa Stanek Rea  
*Acting Director of the United States Patent and Trademark Office*